US008760241B1

(12) United States Patent
Ashworth et al.

(10) Patent No.: US 8,760,241 B1
(45) Date of Patent: Jun. 24, 2014

(54) CIRCUIT ISOLATION USING A SIGNAL SPLITTER/COMBINER

(71) Applicant: Wilson Electronics, LLC, St. George, UT (US)

(72) Inventors: Christopher K. Ashworth, St. George, UT (US); James W. Wilson, Diamond Valley, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 13/837,230

(22) Filed: Mar. 15, 2013

(51) Int. Cl.
*H03H 7/46* (2006.01)
*H01P 5/12* (2006.01)

(52) U.S. Cl.
USPC ............................ 333/132; 333/126; 333/129

(58) Field of Classification Search
USPC .................................. 333/126–129, 132, 134
See application file for complete search history.

(56) References Cited

U.S. PATENT DOCUMENTS

2009/0289739 A1 * 11/2009 Sasaki et al. .................. 333/132

* cited by examiner

*Primary Examiner* — Robert Pascal
*Assistant Examiner* — Kimberly Glenn
(74) *Attorney, Agent, or Firm* — Maschoff Brennan

(57) ABSTRACT

According to some embodiments described herein, a system of providing filter isolation may include a first filter configured to pass a first frequency range and a second filter configured to pass a second frequency range. The system may also include a signal splitter/combiner communicatively coupled to the first filter at a first port of the signal splitter/combiner and communicatively coupled to the second filter at a second port of the signal splitter/combiner. The signal splitter/combiner may be configured to receive a first signal filtered by the first filter at the first port of the signal splitter/combiner. The signal splitter/combiner may also be configured to direct the first signal from the first port to a third port of the signal splitter/combiner and away from the second port such that the signal splitter/combiner directs the first signal away from the second filter.

20 Claims, 5 Drawing Sheets

CIRCUIT ISOLATION USING A SIGNAL SPLITTER/COMBINER

FIELD

The present disclosure relates to circuit isolation using a signal splitter/combiner.

BACKGROUND

In a wireless communication system, communication may occur as uplink communications and downlink communications. Uplink communications may refer to communications that originate at a wireless communication device (referred to hereinafter as "wireless device") and that are transmitted to an access point (e.g., base station, remote radio head, wireless router, etc.) associated with the wireless communication system. Downlink communications may refer to communications from the access point to the wireless device. Devices configured to receive and/or transmit wireless signals may be configured to separate the uplink signals from the downlink signals such that the devices may process the uplink and downlink signals separately.

Additionally, wireless communications may be used in a wide variety of applications and for a variety of uses. Because of the many uses, portions of a frequency spectrum (commonly referred to as "bands") used for wireless communications may be designated for certain uses to help reduce interference experienced by the wireless communications. In some instances, the frequency ranges associated with designated bands may be separated by a certain degree of frequency spacing referred to as a guard band. The guard band may help reduce interference between signals transmitted within different designated bands. In some instances, the guard bands may be substantially narrow such that processing signals that may be transmitted in bands separated by a narrow guard band may be difficult.

The subject matter claimed herein is not limited to embodiments that solve any disadvantages or that operate only in environments such as those described above. Rather, this background is only provided to illustrate one example technology area where some embodiments described herein may be practiced.

SUMMARY

According to some embodiments described herein, a system of providing filter isolation may include a first filter configured to pass a first frequency range and a second filter configured to pass a second frequency range. The system may also include a signal splitter/combiner communicatively coupled to the first filter at a first port of the signal splitter/combiner and communicatively coupled to the second filter at a second port of the signal splitter/combiner. The signal splitter/combiner may be configured to receive a first signal filtered by the first filter at the first port of the signal splitter/combiner. The signal splitter/combiner may also be configured to direct the first signal from the first port to a third port of the signal splitter/combiner and away from the second port such that the signal splitter/combiner directs the first signal away from the second filter.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
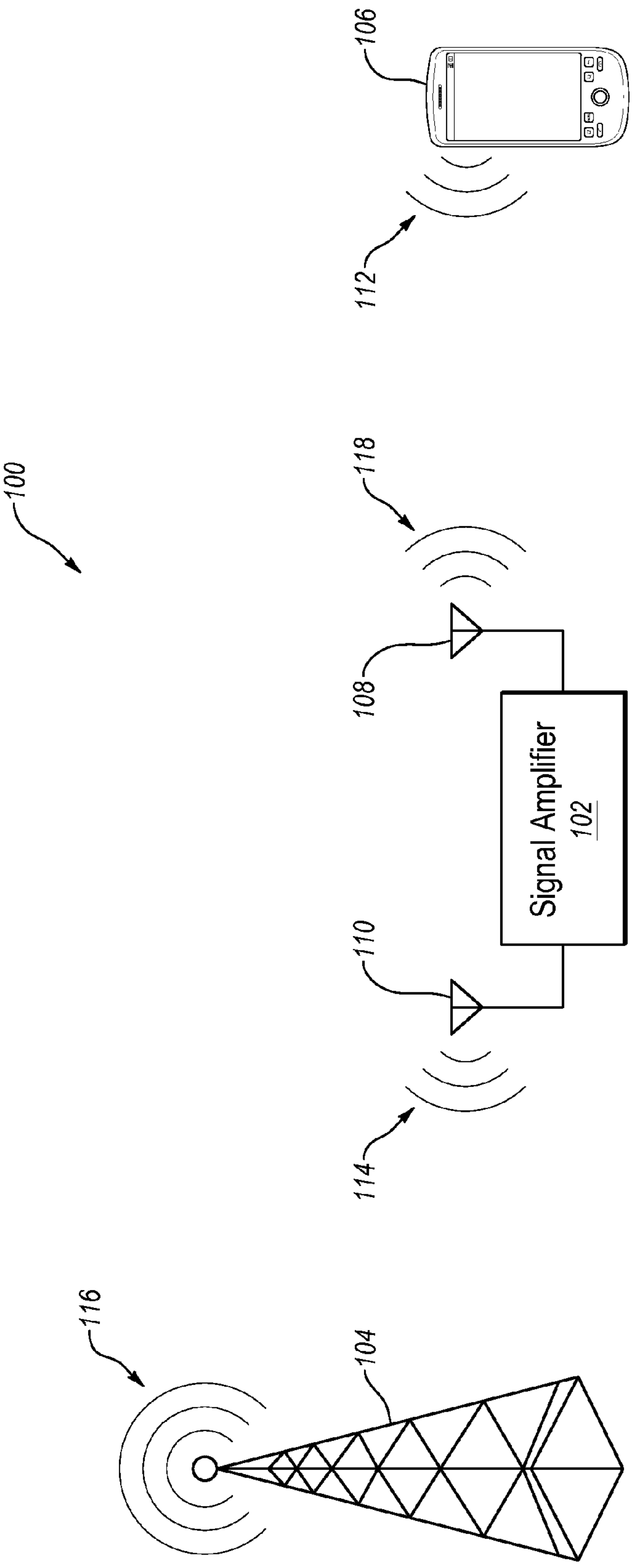
FIG. 1 illustrates an example wireless communication system.

According to some embodiments, a signal splitter/combiner may be used to provide isolation between circuits. For purposes of explanation, the circuit isolation using a signal splitter/combiner is described with respect to a signal booster of a wireless communication system. However, the present disclosure is not limited to applications with respect to signal boosters. As described in further detail below, in some embodiments a signal splitter/combiner may be configured to provide isolation between an uplink path and a downlink path of a signal booster. In these and other embodiments, the signal splitter/combiner may be configured to provide isolation between filters included in the signal booster.

Using a signal splitter/combiner to provide isolation between uplink and downlink paths may reduce a number of more expensive components that may be traditionally used to provide isolation between uplink and downlink signal paths. Additionally, using a signal splitter/combiner to provide isolation between filters may reduce roll-off requirements associated with the filters.

In the present disclosure, the terms "isolation" or "isolated" with respect to circuits (e.g., uplink paths, downlink paths, filters, etc.) may refer to reducing the presence of unwanted signals received by or within a circuit. For example, reducing the presence of uplink signals in a downlink path of a signal booster or reducing the presence of downlink signals in an uplink path of the signal booster may improve isolation between the uplink path and the downlink path. The isolation may be accomplished by directing unwanted signals away from particular circuits, attenuating the unwanted signals within the particular circuits, or using any other suitable method or mechanism. In some embodiments, isolation may be referred to in dB indicating a degree of attenuation of an unwanted signal in a particular circuit or path. For example, an isolation of 30 dB between uplink and downlink paths may indicate that a downlink signal may be attenuated by 30 dB in the uplink path and/or that an uplink signal may be attenuated by 30 dB in the downlink path.

The term "uplink" may refer to communications that are transmitted to the access point from the wireless device. The term "downlink" may refer to communications that are transmitted to the wireless device from the access point.

Additionally, the terms "frequency range," "frequency band," "communication band," or "band" may refer to one or more applicable frequencies within the electromagnetic spectrum. In some embodiments, the terms "frequency range," "frequency band," "communication band," or "band" may also refer to frequencies designated for a particular use (e.g., cellular communication, public safety communication, uplink communication, downlink communication, etc.).

Further, in some instances a "frequency range," "band," "frequency band," or "communication band" may refer to a contiguous frequency range while in other instances the terms "frequency range," "band," "frequency band," or "communication band" may refer to multiple non-contiguous frequency ranges. Additionally, as indicated above, a "frequency range," "band," "frequency band," or "communication band" may include one or more sub-ranges or sub-bands (e.g., a frequency band may include an uplink band and a downlink band).

FIG. 1 illustrates an example wireless communication system 100 (referred to hereinafter as "system 100"), arranged in accordance with at least some embodiments described herein. The system 100 may be configured to provide wireless communication services to a wireless device 106 via an access point 104. The system 100 may further include a bi-directional signal booster 102 (referred to hereinafter as "the signal booster 102"). The signal booster 102 may be any suitable system, device, or apparatus configured to receive wireless signals (e.g., radio frequency (RF) signals) communicated between the access point 104 and the wireless device 106. The signal booster 102 may be configured to amplify, repeat, filter, and/or otherwise process the received wireless signals and may be configured to re-transmit the processed wireless signals. Although not expressly illustrated in FIG. 1, the system 100 may include any number of access points 104 providing wireless communication services to any number of wireless devices 106.

The wireless communication services provided by the system 100 may include voice services, data services, messaging services, and/or any suitable combination thereof. The system 100 may include a Frequency Division Duplexing network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 100 may be configured to operate as a second generation (2G) wireless communication network, a third generation (3G) wireless communication network, a fourth generation (4G) wireless communication network, and/or a Wi-Fi network. In these or other embodiments, the system 100 may be configured to operate as a Long Term Evolution (LTE) wireless communication network.

The access point 104 may be any suitable wireless network communication point and may include, by way of example but not limitation, a base station, a remote radio head (RRH), a satellite, a wireless router, or any other suitable communication point. The wireless device 106 may be any device that may use the system 100 for obtaining wireless communication services and may include, by way of example and not limitation, a cellular phone, a smartphone, a personal data assistant (PDA), a laptop computer, a personal computer, a tablet computer, a wireless communication card, or any other similar device configured to communicate within the system 100.

As signals propagate between the access point 104 and the wireless device 106, the signals may be affected during the propagation such that, in some instances, the wireless signals communicated between the access point 104 and the wireless device 106 may be substantially degraded. The signal degradation may result in the access point 104 or the wireless device 106 not receiving, detecting, or extracting information from the wireless signals. Therefore, the signal booster 102 may be configured to increase the power of and/or improve the signal quality of the wireless signals such that the communication of the wireless signals between the access point 104 and the wireless device 106 may be improved.

In some embodiments, the signal booster 102 may receive a wireless signal communicated between the access point 104 and the wireless device 106 that may be converted into an electrical signal (e.g., via an antenna). The signal booster may be configured to amplify the electrical signal and the amplified electrical signal may be converted into an amplified wireless signal that is transmitted. The signal booster 102 may amplify the electrical signal by applying a gain to the electrical signal. The gain may be a set gain or a variable gain, and may be less than, equal to, or greater than one. Therefore, in the present disclosure, the term "amplify" may refer to applying any gain to a wireless signal even if the gain is less than one.

In some embodiments, the signal booster 102 may adjust the gain based on conditions associated with communicating the wireless signals (e.g., providing noise floor, oscillation, and/or overload protection). In these and other embodiments, the signal booster 102 may adjust the gain in real time. The signal booster 102 may also filter out noise associated with the received wireless signal such that the retransmitted wireless signal may be a cleaner signal than the received wireless signal. Therefore, the signal booster 102 may improve the communication of wireless signals between the access point 104 and the wireless device 106.

For example, the wireless device 106 may communicate a wireless uplink signal 112 intended for reception by the access point 104 and a first antenna 108 may be configured to receive the wireless uplink signal. The first antenna 108 may be configured to convert the received wireless uplink signal 112 into an electrical uplink signal. Additionally, the first antenna 108 may be communicatively coupled to a first interface port (not expressly depicted in FIG. 1) of the signal booster 102 such that the signal booster 102 may receive the electrical uplink signal 112 at the first interface port. An interface port may be any suitable port configured to interface the signal booster 102 with another device (e.g., an antenna or a modem) from which the signal booster 102 may receive a signal and/or to which the signal booster 102 may communicate a signal.

In some embodiments, the signal booster 102 may be configured to apply a gain to the electrical uplink signal to amplify the electrical uplink signal. In the illustrated embodiment, the signal booster 102 may direct the amplified electrical uplink signal toward a second interface port (not expressly depicted in FIG. 1) of the signal booster 102 that may be communicatively coupled to a second antenna 110. The second antenna 110 may be configured to receive the amplified electrical uplink signal from the second interface port and may convert the amplified electrical uplink signal into an amplified wireless uplink signal 114 that may also be transmitted by the second antenna 110. The amplified wireless uplink signal 114 may be received by the access point 104.

In some embodiments, the signal booster 102 may also be configured to filter the electrical uplink signal to remove at least some noise associated with the received wireless uplink signal 112. Consequently, the amplified wireless uplink signal 114 may have a better signal to noise ratio (SNR) than the wireless uplink signal 112 that may be received by the first antenna 108. Accordingly, the signal booster 102 may be configured to improve the communication of uplink signals between the access point 104 and the wireless device 106. The use of the term "uplink signal" without specifying wireless or electrical uplink signals may refer to wireless uplink signals or electrical uplink signals.

As another example, the access point 104 may communicate a wireless downlink signal 116 intended for the wireless device 106 and the second antenna 110 may be configured to receive the wireless downlink signal 116. The second antenna 110 may convert the received wireless downlink signal 116 into an electrical downlink signal such that the electrical downlink signal may be received at the second interface port of the signal booster 102. In some embodiments, the signal booster 102 may be configured to apply a gain to the electrical downlink signal to amplify the electrical downlink signal. The signal booster 102 may also be configured to direct the amplified electrical downlink signal toward the first interface port of the signal booster 102 such that the first antenna 108 may receive the amplified electrical downlink signal. The first antenna 108 may be configured to convert the amplified electrical downlink signal into an amplified wireless downlink signal that may also be transmitted by the first antenna 108. Accordingly, the amplified downlink signal 118 may be received by the wireless device 106.

In some embodiments, the signal booster 102 may also be configured to filter the electrical downlink signal to remove at least some noise associated with the received wireless downlink signal 116. Therefore, the amplified wireless downlink signal 118 may have a better SNR than the wireless downlink signal 116 received by the second antenna 110. Accordingly, the signal booster 102 may also be configured to improve the communication of downlink signals between the access point 104 and the wireless device 106. The use of the term "downlink signal" without specifying wireless or electrical downlink signals may refer to wireless downlink signals or electrical downlink signals.

Modifications may be made to the system 100 without departing from the scope of the present disclosure. For example, in some embodiments, the distance between the signal booster 102 and the wireless device 106 may be relatively close as compared to the distance between the signal booster 102 and the access point 104. Further, the system 100 may include any number of signal boosters 102, access points 104, and/or wireless devices 106. Additionally, in some embodiments the signal booster 102 may be integrated with the wireless device 106, and in other embodiments, the signal booster 102 may be separate from the wireless device 106. Also, in some embodiments, the signal booster 102 may be included in a cradle configured to hold the wireless device 106. Additionally, in some embodiments, the signal booster 102 may be configured to communicate with the wireless device 106 via wired communications (e.g., using electrical signals communicated over a wire) instead of wireless communications (e.g., via wireless signals).

Additionally, although the signal booster 102 is illustrated and described with respect to receiving and transmitting signals via the first antenna 108 and the second antenna 110, the scope of the present disclosure is not limited to such applications. For example, in some embodiments, the signal booster 102 (or other signal boosters described herein) may receive and/or transmit signals via one or more modems.

Figure 2:
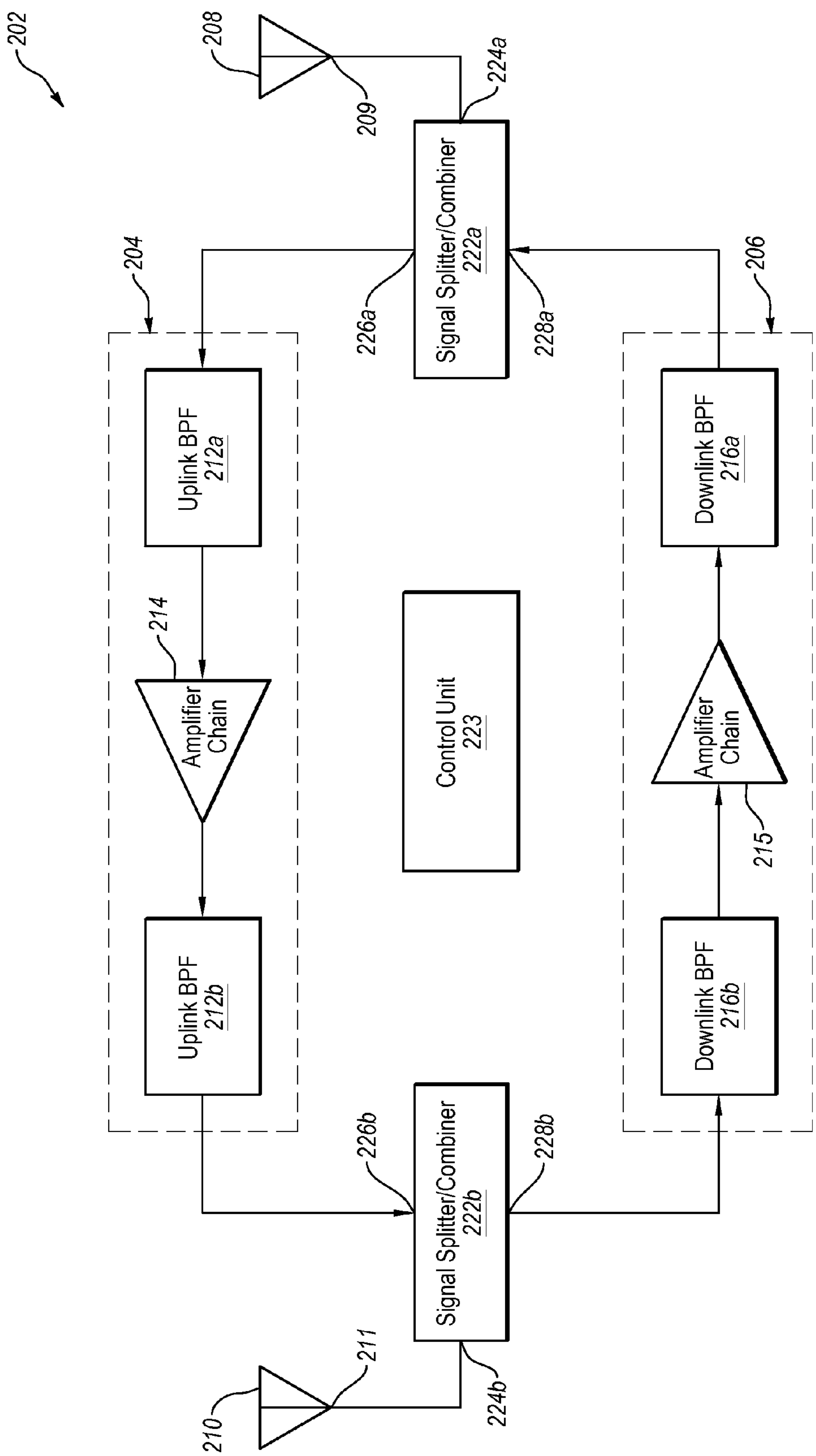
FIG. 2 illustrates an example embodiment of a signal booster.

Further, as mentioned above, in some embodiments, the signal booster 102 may include a signal splitter/combiner that may be configured to provide isolation between an uplink path and a downlink path of the signal booster 102, as described with respect to FIG. 2. In these and other embodiments, the signal booster 102 may include a signal splitter/combiner that may be configured to provide isolation between filters included in the signal booster 102, as described with respect to FIGS. 2 and 3.

FIG. 2 illustrates an example embodiment of a signal booster 202, arranged in accordance with at least some embodiments described herein. In some embodiments, the signal booster 202 may be configured to operate in a manner analogous to the signal booster 102 of the system 100 of FIG. 1. The signal booster 202 may include a first interface port 209 communicatively coupled to a first antenna 208 and a second interface port 211 communicatively coupled to a second antenna 210. The signal booster 202 may also include an uplink path 204 and a downlink path 206, each communicatively coupled between the first interface port 209 and the second interface port 211.

The uplink path 204 may include an uplink amplifier chain 214 and the downlink path 206 may include a downlink amplifier chain 215. The uplink amplifier chain 214 and the downlink amplifier chain 215 may include one or more amplifiers configured to apply a gain to signals received by the uplink amplifier chain 214 or by the downlink amplifier chain 215. The gain may be a set gain or a variable gain and may be less than, equal to, or greater than one. In some embodiments the gain of the uplink amplifier chain 214 and the downlink amplifier chain 215 may be adjusted together or independently by a control unit 223 communicatively coupled to the uplink amplifier chain 214 and the downlink amplifier chain 215. In some embodiments the control unit 223 may adjust the gain of the uplink amplifier chain 214 and the downlink amplifier chain 215 based on wireless communication conditions.

If included in the signal booster 202, the control unit 223 may be implemented by any suitable mechanism, such as a program, software, function, library, software as a service, analog or digital circuitry, or any combination thereof. The control unit 223 may also include a processor coupled to memory. The processor may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor may interpret and/or execute program instructions and/or process data stored in the memory. The instructions may include instructions for adjusting the gain of the common amplifier chain 220. For example, the adjustments may be based on wireless signal inputs.

The memory may include any suitable computer readable media configured to retain program instructions and/or data for a period of time. By way of example, and not limitation, such computer readable media may include tangible computer readable storage media including random access memory (RAM), read only memory (ROM), electrically erasable programmable read only memory (EEPROM), compact disk read only memory (CD ROM) or other optical disk storage, magnetic disk storage or other magnetic storage devices, flash memory devices (e.g., solid state memory devices) or any other storage medium which may be used to carry or store desired program code in the form of computer executable instructions or data structures and which may be accessed by a general purpose or special purpose computer. Combinations of the above may also be included within the scope of computer readable media. Computer executable instructions may include, for example, instructions and data that cause a general purpose computer, special purpose computer, or special purpose processing device to perform a certain function or group of functions.

The signal booster 202 may be configured such that uplink signals that may be received at the first interface port 209 from the first antenna 208 may be directed toward the uplink path 204. The signal booster 202 may also be configured such that the uplink signals may be directed from the uplink path 204 toward the second interface port 211 and the second antenna 210. Additionally, the signal booster 202 may be configured such that downlink signals that may be received at the second interface port 211 from the second antenna 210 may be directed toward the downlink path 206. The signal booster 202 may also be configured to direct the downlink signals from the downlink path 206 toward the first interface port 209 and the first antenna 208.

The signal booster 202 may include signal splitters/combiners 222*a* and 222*b* that may be configured to direct the uplink signals and the downlink signals in the manner described above such that the signal splitters/combiners 222*a* and 222*b* may be configured as duplexers with respect to the uplink path 204 and the downlink path 206. For example, the signal splitters/combiners 222*a* and 222*b* may include first ports 224*a* and 224*b*, respectively, second ports 226*a* and 226*b*, respectively, and third ports 228*a* and 228*b*, respectively. The first ports 224*a* and 224*b* may be communicatively coupled to the first interface port 209 and the second interface port 211, respectively. The second ports 226*a* and 226*b* may be communicatively coupled to the uplink path 204 and the third ports 228*a* and 228*b* may be communicatively coupled to the downlink path 206.

The signal splitters/combiners 222*a* and 222*b* may also be configured to split signals received at their respective first ports 224 into two signal portions, where a combined power level of the two signal portions may approximate a power level of the undivided signal received at the respective first ports 224. The signal splitters/combiners 222*a* and 222*b* may also be configured to output one of the signals portions through their respective second ports 226 and output the other signal portion through their respective third ports 228. Accordingly, the signal splitters/combiners may act as signal/power splitters with respect to signals received at their respective first ports 224, but may not act as a typical duplexer either.

Additionally, the signal splitters/combiners 222*a* and 222*b* may be configured to output signals received at their respective second ports 226 and/or third ports 228 at their respective first ports 224. Further, when a signal is received at the second port 226 and another signal is received at the third port 228 of a signal splitter/combiner 222 at substantially the same time, the signal splitter/combiner 222 may combine the two signals into one combined signal. The power level of the combined signal may be approximately that of the sum of the power levels of the two signals. Accordingly, the signal splitters/combiners 222 may act as signal/power combiners with respect to signals received at their respective second ports 226 and third ports 228 at approximately the same time.

In the illustrated embodiment, the signal splitter/combiner 222*a* may be configured to direct downlink signals received from the downlink path 206 at the third port 228*a* toward the first antenna 208 via the first port 224*a*. Similarly, the signal splitter/combiner 222*b* may be configured to direct uplink signals received from the uplink path 204 at the second port 226*b* toward the second antenna 210 via the first port 224*b*. Accordingly, the signal splitter/combiner 222*a* may direct downlink signals received from the downlink path 206 away from the uplink path 204 and the signal splitter/combiner 222*b* may direct uplink signals received from the uplink path 204 away from the downlink path 206 to provide isolation between the uplink path 204 and the downlink path 206. Therefore, the signal splitters/combiners 222*a* and 222*b* may be configured as duplexers that may provide isolation between the uplink path 204 and the downlink path 206

Additionally, as mentioned above, upon receiving an uplink signal at the first port 224*a* from the first interface port 209, the signal splitter/combiner 222*a* may split the uplink signal into two uplink signal portions. One of the uplink signal portions may be communicated to the uplink path 204 via the second port 226*a* and the other uplink signal portion may be communicated to the downlink path 206 via the third port 228*a*. Similarly, upon receiving a downlink signal at the second port 224*b* from the second interface port 211, the signal splitter combiner 222*b* may split the downlink signal into two downlink signal portions. One of the downlink signal portions may be communicated to the uplink path 204 via the second port 226*b* and the other downlink signal portion may be communicated to the downlink path 206 via the third port 228*b*.

The uplink amplifier chain 214 may be directional such that the uplink amplifier chain 214 may be configured to amplify signals that propagate through the uplink path 204 in a first direction from the signal splitter/combiner 222*a* to the signal splitter/combiner 222*b* (e.g., uplink signals received at the first antenna 208). The directionality of the uplink amplifier chain 214 may also be such that the uplink amplifier chain 214 may be configured to attenuate or stop signals propagating through the uplink path 204 in a second direction from the signal splitter/combiner 222*b* to the signal splitter/combiner 222*a* (e.g., downlink signals received at the second antenna 210). Accordingly, the uplink amplifier chain 214 may be configured to attenuate or stop a downlink signal that may be received by the uplink amplifier chain 214 from the signal splitter/combiner 222*b*.

The downlink amplifier chain 215 may also be directional such that the downlink amplifier chain 215 may be configured to amplify signals propagating through the downlink path 206 in the second direction from the signal splitter/combiner 222*b* to the signal splitter/combiner 222*a* (e.g., downlink signals received at the second antenna 210). The directionality of the downlink amplifier chain 215 may also be such that the downlink amplifier chain 215 may be configured to attenuate or stop signals propagating through the downlink path 206 in the first direction from the signal splitter/combiner 222*a* to the signal splitter/combiner 222*b* (e.g., uplink signals received at the first antenna 208). Accordingly, the downlink amplifier chain 215 may be configured to attenuate or stop an uplink signal that may be received by the downlink amplifier chain 214 from the signal splitter/combiner 222*a*.

The ability of the uplink amplifier chain 214 to stop and/or attenuate signals propagating in the second direction may depend on the signal power of the signal propagating in the second direction. Similarly, the ability of the downlink amplifier chain 215 to stop and/or attenuate signals propagating in the first direction may depend on the signal power of the signal propagating in the first direction. The ability of the uplink amplifier chain 214 to stop and/or attenuate signals propagating in the second direction may also depend on the gain of the uplink amplifier chain 214 being higher than the power of the signal propagating in the second direction. Similarly, the ability of the downlink amplifier chain 215 to stop and/or attenuate signals propagating in the first direction may also depend on the gain of the downlink amplifier chain 215 being higher than the power of the signal propagating in the first direction.

As mentioned above, downlink signals or portions of downlink signals that may be received by the uplink path 204 from the signal splitter/combiner 222*b* may be attenuated such that the ability of the uplink amplifier chain 214 to attenuate or stop the downlink signals or portions of downlink signals may be increased by the signal splitter/combiner 222*b*. Similarly, uplink signals or portions of uplink signals that may be received by the downlink path 206 from the signal splitter/combiner 222*a* may be attenuated such that the ability of the downlink amplifier chain 215 to attenuate or stop the uplink signals or portions of uplink signals may be increased by the signal splitter/combiner 222*a*.

In some embodiments, the signal splitter/combiner 222*a* may also be configured such that the first port 224*a* may provide substantial impedance matching with the first interface port 209 and the first antenna 208, the second port 226*a* may provide substantial impedance matching with the uplink path 204 (or one or more of its components) and the third port 228*a* may provide substantial impedance matching with the downlink path 206 (or one or more of its components). Additionally, the signal splitter/combiner 222*b* may be configured such that the first port 224*b* may provide substantial impedance matching with the second interface port 211 and the second antenna 210, the second port 226*b* may provide substantial impedance matching with the uplink path 204 (or one or more of its components) and the third port 228*b* may provide substantial impedance matching with the downlink path 206 (or one or more of its components). The incidence of standing waves within the signal booster 202, which may increase signal power, may be reduced by the impedance matching.

As indicated above, isolation between circuits or paths may relate to the amount of power of an unwanted signal that may leak into or be communicated to a circuit (e.g., an uplink or downlink path or a filter). Therefore, standing waves that increase signal power may result in diminished isolation between circuits or paths because the greater signal power of a signal may result in higher power of the signal in a circuit where the signal may be unwanted. Accordingly, providing impedance matching by the signal splitters/combiners 222*a* and 222*b* may also improve isolation between the uplink path 204 and the downlink path 206.

In some embodiments, the uplink path 204 may include one or more uplink band pass filters (BPF), such as an uplink BPF 212*a* and an uplink BPF 212*b*. The uplink BPFs 212*a* and 212*b* may be configured based on an uplink band associated with the uplink signals such that frequencies within the uplink band may pass through the uplink BPFs 212*a* and 212*b* while frequencies outside of the uplink band (e.g., frequencies within a downlink band associated with the downlink signals, noise, etc.) may be filtered out by the uplink BPFs 212*a* and 212*b*.

In the illustrated embodiment, the uplink BPF 212*a* may be communicatively coupled between the uplink amplifier chain 214 and the second port 226*a* of the signal splitter/combiner 222*a*. Therefore, in the illustrated embodiment, the uplink BPF 212*a* may be configured to filter out signals output at the second port 226*a* that may be transmitted outside of the uplink band. Additionally, in the illustrated embodiment, the uplink BPF 212*b* may be communicatively coupled between the uplink amplifier chain 214 and the second port 226*b* of the signal splitter/combiner 222*b*. As such, in the illustrated embodiment, the uplink BPF 212*b* may be configured to filter out signals output at the second port 226*b* that may be transmitted outside of the uplink band.

The downlink path 206 may include one or more downlink BPFs, such as a downlink BPF 216*a* and a downlink BPF 216*b*. The downlink BPFs 216*a* and 216*b* may be configured based on a downlink band such that frequencies within the downlink band may pass through the downlink BPFs 216*a* and 216*b* while frequencies outside of the downlink band (e.g., frequencies within an uplink band, noise, etc.) may be filtered out by the downlink BPFs 216*a* and 216*b*.

In the illustrated embodiment, the downlink BPF 216*a* may be communicatively coupled between the downlink amplifier chain 215 and the third port 228*a* of the signal splitter/combiner 222*a*. Therefore, in the illustrated embodiment, the downlink BPF 216*a* may be configured to filter out signals output at the third port 228*a* that may be transmitted outside of the downlink band. Additionally, in the illustrated embodiment, the downlink BPF 216*b* may be communicatively coupled between the downlink amplifier chain 215 and the third port 228*b* of the signal splitter/combiner 222*b*. Therefore, in the illustrated embodiment, the downlink BPF 216*b* may be configured to filter out signals output at the third port 228*b* that may be transmitted outside of the downlink band.

In some embodiments, configuring the signal splitters/combiners 222*a* and 222*b* in the manner described above may reduce the roll off requirements of at least one of the uplink BPFs 212*a* and 212*b* and the downlink BPFs 216*a* and 216*b*. For example, in some instances the guard bands between the uplink and downlink bands may be relatively narrow (e.g., less than 30 MHz). Therefore, without the signal splitters/combiners 222*a* and 222*b*, the filters of the uplink BPFs 212*a* and 212*b* may need to have a relatively steep roll off in order to adequately filter out downlink signals, which may add costs. Similarly, without the signal splitters/combiners 222*a* and 222*b*, the filters of the downlink BPFs 216*a* and 216*b* may also need to have a relatively steep roll off in order to adequately filter out the downlink signals, which may also add more cost.

However, by configuring the signal splitters/combiners 222*a* and 222*b* as depicted, the roll off requirements of the uplink BPFs 212*a* and 212*b* and the downlink BPFs 216*a* and 216*b* may be reduced because the occurrence and/or power levels of uplink signals received by the downlink BPFs 216*a* and 216*b* and the occurrence and/or power levels of downlink signals received by the uplink BPFs 212*a* and 212*b* may be reduced by the signal splitters/combiners 222*a* and 222*b*.

Modifications, additions, or omissions may be made to the signal amplifier 202 without departing from the scope of the present disclosure. For example, the use of a signal splitter/combiner to provide isolation with respect to circuits is not limited to the specific implementation of the signal amplifier 202 illustrated. For example, signal splitters/combiners may be used to isolate other downlink and uplink paths than those specifically illustrated.

Further, a signal splitter/combiner, such as the signal splitters/combiner 222*a* or 222*b*, may be used to provide isolation between filters in any appropriate circuit to reduce the roll off requirements of the filters and need not be configured as a duplexer while doing so. For example, in some embodiments and as described in further detail below with respect to FIG. 3, a signal splitter/combiner, such as the signal splitter/combiner 222*a* or the signal splitter/combiner 222*b*, may be configured to provide isolation between two duplexers that may include filters such that the signal splitter/combiner may isolate and reduce the roll off requirements of the duplexers and their associated filters.

Additionally, a signal splitter/combiner, such as the signal splitter/combiner 222*a* or the signal splitter/combiner 222*b*, may be used to provide isolation between any other appropriate circuits to improve performance of the circuits. For example, in some embodiments, a signal splitter/combiner may be used to provide isolation between two circulators that may not necessarily perform filtering but that may be configured as duplexers to direct uplink and downlink signals to their desired paths.

Moreover, the number of and type of components included in the signal booster 202 may vary depending on specific implementations. For example, in some embodiments, any one of the uplink BPFs 212*a* and 212*b* and/or the downlink BPFs 216*a* and 216*b* may be omitted from the signal booster 202. Further, in some embodiments, the signal booster 202 may include more uplink amplifier chains and/or downlink amplifier chains. Also, in some embodiments, the signal booster 202 may include one or more signal attenuators and/or one or more signal power detectors.

Figure 3:
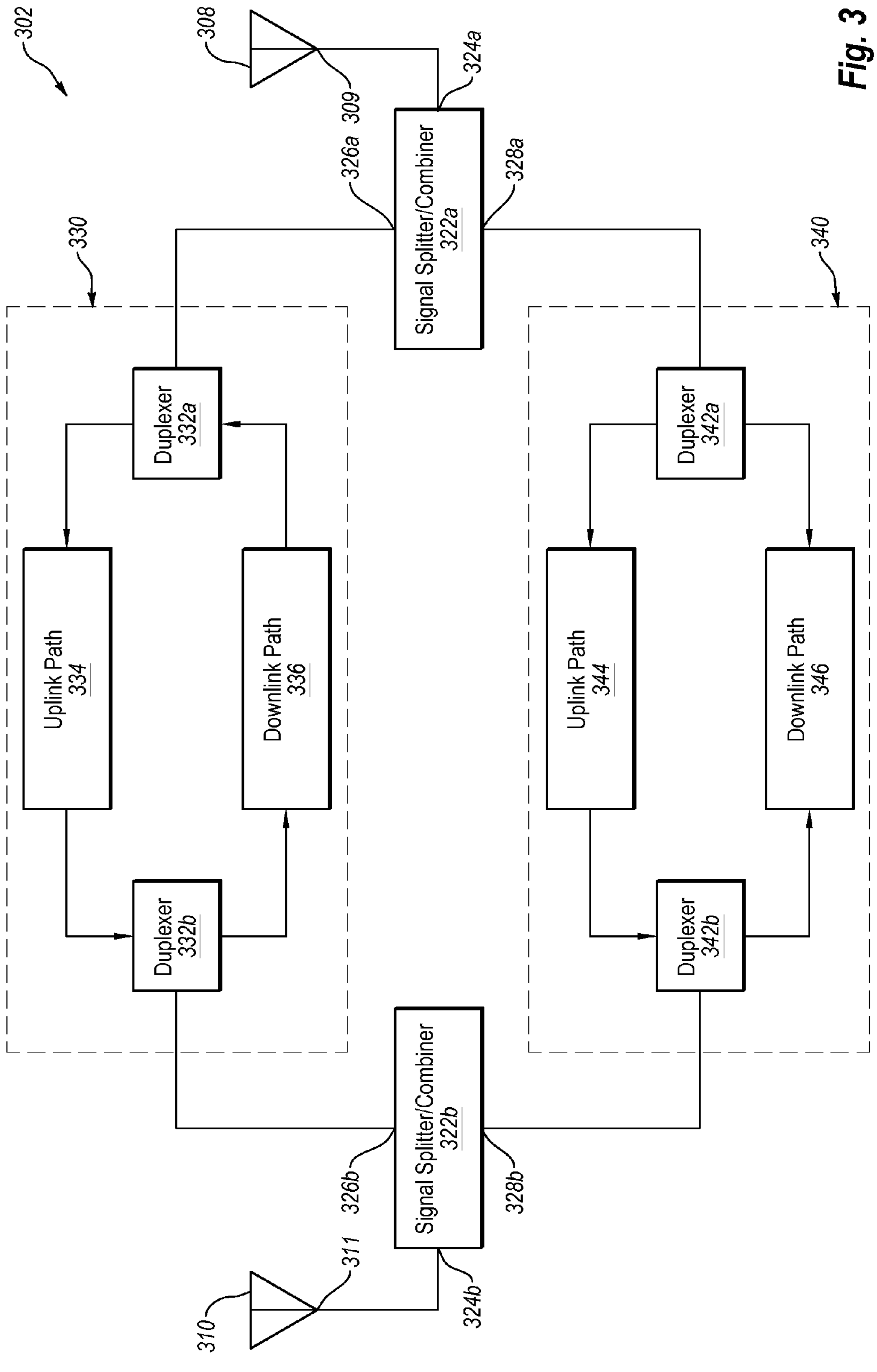
FIG. 3 illustrates another example embodiment of a signal booster.

FIG. 3 illustrates an example embodiment of a signal booster 302, arranged in accordance with at least some embodiments described herein. In some embodiments, the signal booster 302 may be configured to operate in a manner analogous to the signal booster 102 of the system 100 of FIG. 1. The signal booster 302 may include a first interface port 309 communicatively coupled to a first antenna 308, a second interface port 311 communicatively coupled to a second antenna 310, and upper-band circuitry 330 and lower-band circuitry 340 communicatively coupled between the first interface port 309 and the second interface port 311.

The upper-band circuitry 330 may be configured to receive and process (e.g., amplify) uplink and downlink signals that may be communicated in an upper frequency band (referred to hereinafter as "the upper-band"), which may be used by a wireless communication system. The uplink and downlink frequencies associated with the upper frequency band may be referred to hereinafter as "upper-band uplink signals" and "upper-band downlink signals." By way of example, in some embodiments, the upper-band circuitry 330 may be configured to process uplink and downlink signals transmitted in a 1,900 MHz frequency range.

The lower-band circuitry 340 may be configured to receive and process uplink and downlink signals that may be communicated in a lower frequency band (referred to hereinafter as "the lower-band"), which may be used by a wireless communication system. The uplink and downlink frequencies associated with the lower frequency band may be referred to hereinafter as "lower-band uplink signals" and "lower-band downlink signals." By way of example, in some embodiments, the lower-band circuitry 340 may be configured to process uplink and downlink signals transmitted in a 700 MHz range and/or an 800 MHz frequency range.

In some embodiments, the upper-band circuitry 330 may include upper-band duplexers 332*a* and 332*b*, an upper-band uplink path 334 and an upper-band downlink path 336 that together may be configured to direct and process (e.g., amplify, attenuate and/or filter) the upper-band uplink and downlink signals. Additionally, in some embodiments, the lower-band circuitry 340 may include lower-band duplexers 342*a* and 342*b*, a lower-band uplink path 344 and a lower-band downlink path 346 that together may be configured to direct and process (e.g., amplify, attenuate and/or filter) the lower-band uplink and downlink signals.

For example, the upper-band duplexer 332*a* may be configured to receive upper-band uplink signals that may be received at the first interface port 309 from the first antenna 308 and may be configured to direct the upper-band uplink signals toward the upper-band uplink path 334. The upper-band uplink path 334 may be configured to process the upper-band uplink signals and may direct the upper-band uplink signals toward the upper-band duplexer 332*b*. The upper-band duplexer 332*b* may be configured to direct the upper-band uplink signals toward the second interface port 311 and the second antenna 310. The lower-band duplexers 342*a* and 342*b* and the lower-band uplink path 344 may be analogously configured to direct and process lower-band uplink signals.

Additionally, the upper-band duplexer 332*b* may be configured to receive upper-band downlink signals that may be received at the second interface port 311 from the second antenna 310 and may be configured to direct the upper-band downlink signals toward the upper-band downlink path 336. The upper-band downlink path 336 may be configured to process the upper-band downlink signals and may direct the upper-band downlink signals toward the upper-band duplexer 332*a*. The upper-band duplexer 332*a* may be configured to direct the upper-band downlink signals toward the first interface port 309 and the first antenna 308. The lower-band duplexers 342*a* and 342*b* and the lower-band downlink path 346 may be analogously configured to direct and process lower-band downlink signals.

In some embodiments, the upper-band duplexers 332*a* and 332*b* may each include an upper-band uplink filter and an upper-band downlink filter. The upper-band uplink filters may be configured based on an upper-band uplink band associated with the upper-band uplink signals such that frequencies within the upper-band uplink band may pass through the upper-band uplink filters while frequencies outside of the upper-band uplink band may be filtered out by the upper-band uplink filters. For example, the upper-band uplink filters may filter out frequencies within an upper-band downlink band associated with the upper-band downlink signals, frequencies within a lower-band uplink band associated with the lower-band uplink signals, frequencies within a lower-band downlink band associated with the lower-band downlink signals, noise, other frequencies associated with other bands, etc.

The upper-band downlink filters may be configured based on the upper-band downlink band such that frequencies within the upper-band downlink band may pass through the upper-band downlink filters while frequencies outside of the upper-band downlink band may be filtered out by the upper-band downlink filters. For example, the upper-band downlink filters may filter out frequencies within the upper-band uplink band, the lower-band uplink band, the lower-band downlink band, noise, other frequencies associated with other bands, etc.

Similarly, in some embodiments, the lower-band duplexers 342*a* and 342*b* may each include a lower-band uplink filter and a lower-band downlink filter. The lower-band uplink filters may be configured based on the lower-band uplink band such that frequencies within the lower-band uplink band may pass through the lower-band uplink filters while frequencies outside of the lower-band uplink band may be filtered out by the lower-band uplink filters. The lower-band downlink filters may be configured based on the lower-band downlink band such that frequencies within the lower-band downlink band may pass through the lower-band downlink filters while frequencies outside of the lower-band downlink band may be filtered out by the lower-band downlink filters.

In some embodiments, the upper-band circuitry 330 and/or the lower-band circuitry 340 may not include duplexers or the duplexers may not provide filtering (e.g., the duplexers may be circulators or signal splitters/combiners). In these and other embodiments, the uplink and downlink paths (upper-band and/or lower-band) may include BPFs configured based on the frequency ranges associated with the signals that the uplink and downlink paths may each be configured to process. Further, in some embodiments, the uplink or downlink paths may include associated BPFs even when filtering duplexers are present.

The signal booster 302 may also include signal splitters/combiners 322*a* and 322*b*. The signal splitter/combiner 322*a* may include a first port 324*a*, a second port 326*a*, and a third port 328*a*. The signal splitter/combiner 322*b* may include a first port 324*b*, a second port 326*b*, and a third port 328*b*. The first ports 324, the second ports 326, and the third ports 328 may be analogous to the first ports 224, the second ports 226, and the third ports 228, respectively, of the signal splitters/combiners 222*a* and 222*b* of FIG. 2.

In the illustrated embodiment, for the signal splitter/combiner 322*a*, the first port 324*a* may be communicatively coupled to the first interface port 309, the second port 326*a* may be communicatively coupled to the upper-band duplexer 332*a*, and the third port 328*a* may be communicatively coupled to the lower-band duplexer 342*a*. Additionally, for the signal splitter/combiner 322*b*, the first port 324*b* may be communicatively coupled to the second interface port 311, the second port 326*b* may be communicatively coupled to the upper-band duplexer 332*b*, and the third port 328*b* may be communicatively coupled to the lower-band duplexer 342*b*.

Accordingly, the signal splitter/combiner 322*a* may be configured to direct downlink signals received from the upper-band duplexer 332*a* and the lower-band duplexer 342*a* toward the first interface port 309. Similarly, the signal splitter/combiner 322*b* may be configured to direct uplink signals received from the upper-band duplexer 332*b* and the lower-band duplexer 342*b* toward the second interface port 311.

Accordingly, the signal splitter/combiner 322*a* may also be configured to direct upper-band downlink signals received from the upper-band duplexer 332*a* away from the lower-band duplexer 342*a* and may also be configured to direct lower-band downlink signals received from the lower-band duplexer 342*a* away from the upper-band duplexer 332*a*. Additionally, the signal splitter/combiner 322*b* may be configured to direct upper-band uplink signals received from the upper-band duplexer 332*b* away from the lower-band duplexer 342*b* and may be configured to direct lower-band uplink signals received from the lower-band duplexer 342*b* away from the upper-band duplexer 332*b*.

Therefore, the signal splitter/combiner 322*a* may provide isolation between the upper-band circuitry 330 (and its associated filters) and the lower-band circuitry 340 (and its associated filters) with respect to downlink signals that may leave the upper-band circuitry 330 and the lower-band circuitry 340. Additionally, the signal splitter/combiner 322*b* may provide isolation between the upper-band circuitry 330 (and its associated filters) and the lower-band circuitry 340 (and its associated filters) with respect to uplink signals that may leave the upper-band circuitry 330 and the lower-band circuitry 340. Therefore, in some embodiments, configuring the signal splitters/combiners 322*a* and 322*b* in the manner described above may reduce the roll off requirements of the filters that may be used in the upper-band circuitry 330 and the lower-band circuitry 340.

Additionally, upon receiving an uplink signal (upper-band or lower-band) from the first interface port 309, the signal splitter/combiner 322*a* may split the uplink signal into two signal portions where one of the uplink signal portions may be communicated to the upper-band duplexer 332*a* and the other uplink signal portion may be communicated to the lower-band duplexer 342*a*. Similarly, upon receiving a downlink signal (upper-band or lower-band) from the second interface port 311, the signal splitter/combiner 322*b* may split the downlink signal into two signal portions where one of the downlink signal portions may be communicated to the upper-band duplexer 332*b* and the other downlink signal portion may be communicated to the lower-band duplexer 342*b*. As mentioned above, the power of the uplink and downlink signal portions may be attenuated with respect to the undivided uplink and downlink signals.

Therefore, lower-band uplink and downlink signal portions and upper-band downlink signal portions that may be received by upper-band uplink filters of the upper-band circuitry 330 may already be somewhat attenuated before being attenuated even more by the upper-band uplink filters. Similarly, lower-band uplink and downlink signal portions and upper-band uplink signal portions that may be received by upper-band downlink filters of the upper-band circuitry 330 may also already be somewhat attenuated before being attenuated even more by the upper-band downlink filters.

Additionally, upper-band uplink and downlink signal portions and lower-band downlink signal portions that may be received by lower-band uplink filters of the lower-band circuitry 340 may already be somewhat attenuated before being attenuated even more by the lower-band uplink filters. Similarly, upper-band uplink and downlink signal portions and lower-band uplink signal portions that may be received by lower-band downlink filters of the lower-band circuitry 340 may also already be somewhat attenuated before being attenuated even more by the lower-band downlink filters. The already attenuated state of the signal portions before being received by filters that may filter out the signal portions may also help isolate the upper-band circuit 330 (and its associated filters) from the lower-band circuit 340 (and its associated filters).

In some embodiments, the signal splitter/combiner 322*a* may also be configured such that the first port 324*a* may provide substantial impedance matching with the first interface port 309 and the first antenna 308, the second port 326*a* may provide substantial impedance matching with the upper-band circuit 330 (or an associated component such as the duplexer 332*a*, an upper-band uplink filter or an upper-band downlink filter), and the third port 328*a* may provide substantial impedance matching with the lower-band circuit 340 (or an associated component such as the duplexer 342*a*, a lower-band uplink filter or a lower-band downlink filter).

Additionally, the signal splitter/combiner 322*b* may be configured such that the first port 324*b* may provide substantial impedance matching with the second interface port 311 and the second antenna 310, the second port 326*b* may provide substantial impedance matching with the upper-band circuit 330 (or an associated component such as the duplexer 332*b*, an upper-band uplink filter or an upper-band downlink filter) and the third port 328*b* may provide substantial impedance matching with the lower-band circuit 340 (or an associated component such as the duplexer 342*b*, a lower-band uplink filter or a lower-band downlink filter). The impedance matching may reduce standing waves and improve isolation between the upper-band circuitry 330 (and its associated filters) and the lower-band circuitry 340 (and its associated filters).

As such, the signal splitters/combiners 322*a* and 322*b* may be configured to provide isolation between the upper-band circuit 330 and the lower-band circuit 340 to help improve the performance of the upper-band circuit 330 and the lower-band circuit 340. Additionally, as described above, the isolation provided by the signal splitters/combiners 322*a* and 322*b* may provide isolation between filters of the upper-band circuit 330 and the lower-band circuit 340, which may reduce roll-off requirements of the filters.

Modifications, additions, or omissions may be made to the signal amplifier 302 without departing from the scope of the present disclosure. For example, the use of a signal splitter/combiner to provide isolation with respect to circuits is not limited to the specific implementation of the signal amplifier 302 illustrated. Further, a signal splitter/combiner, such as the signal splitters/combiner 322*a* or 322*b*, may be used to provide isolation between filters in any appropriate circuit to reduce the roll off requirements of the filters and need not be configured in the manner specifically described.

Additionally, a signal splitter/combiner, such as the signal splitter/combiner 322*a* or the signal splitter/combiner 322*b*, may be used to provide isolation between any other appropriate circuits to improve performance of the circuits. Moreover, the number of and type of components included in the signal booster 302 may vary depending on specific implementations. For example, in some embodiments, the signal booster 302 may include any number of components such as, but not limited to, a control unit, one or more amplifier chains, one or more signal attenuators and/or one or more signal power detectors. Further, in some embodiments, different numbers of signal splitters/combiners may be used depending on particular applications, as described below with respect to FIG. 4.

Additionally, the use of the terms "upper-band" and "lower-band" is merely to differentiate between bands that may be associated with different frequency ranges. The difference in frequency between the upper-band and the lower-band may vary greatly depending on the particular application. For example, in some instances the upper-band may be within the 800 MHz frequency range and the lower-band may be within the 700 MHz frequency range. In other embodiments, the upper-band may be within the 1,900 MHz frequency range and the lower-band may be within the 700 MHz and/or the 800 MHz frequency range. Additionally, in some embodiments, the upper-band and the lower-band may both be within the 700 MHz frequency range, the 800 MHz frequency range, the 1,900 MHz frequency range, or any other suitable frequency range.

Figure 4:
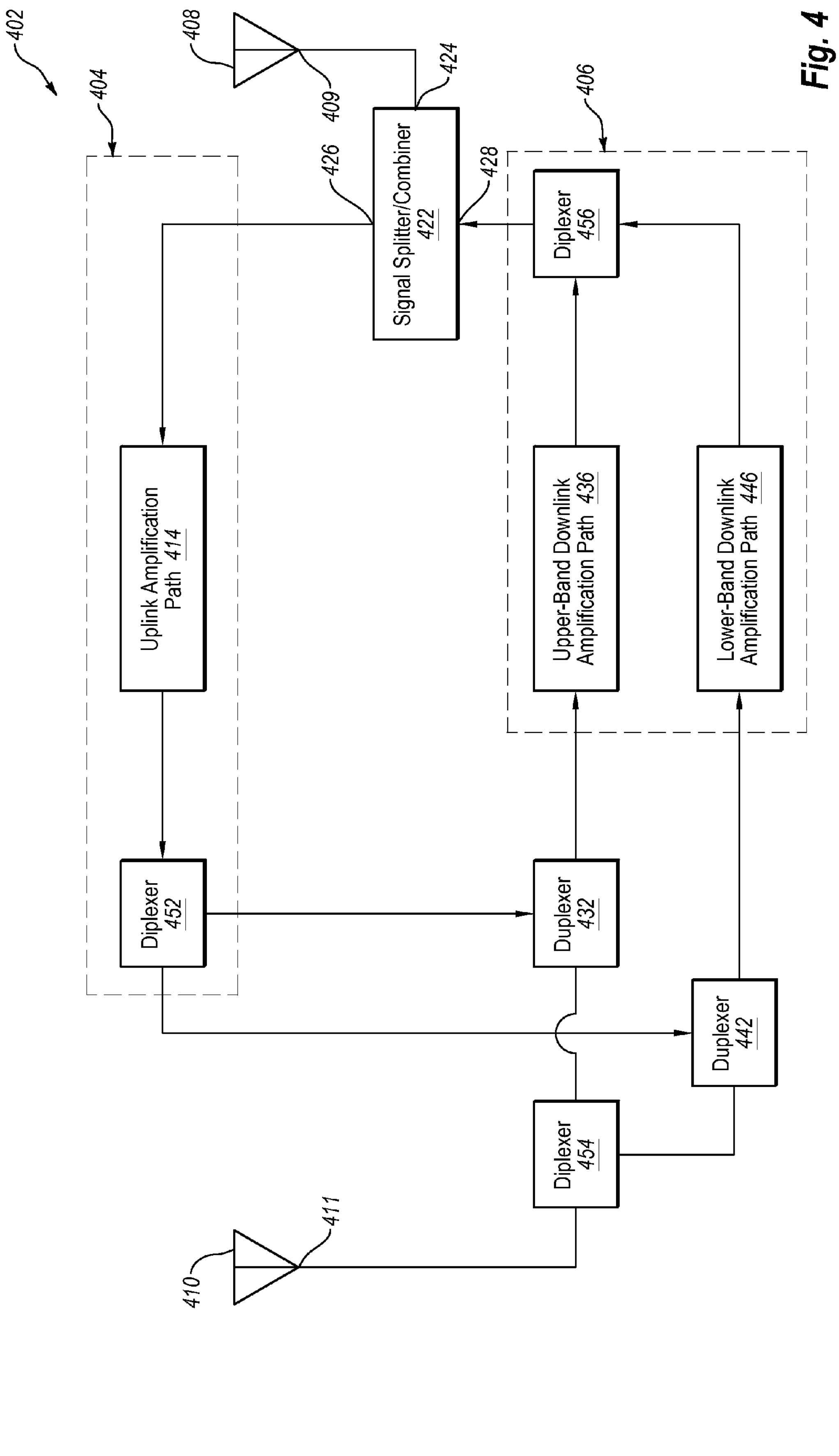
FIG. 4 illustrates another example embodiment of a signal booster.

FIG. 4 illustrates an example embodiment of a signal booster 402, arranged in accordance with at least some embodiments described herein. In some embodiments, the signal booster 402 may be configured to operate in a manner analogous to the signal booster 102 of the system 100 of FIG. 1. The signal booster 402 may include a first interface port 409 communicatively coupled to a first antenna 408 and a second interface port 411 communicatively coupled to a second antenna 410. The signal booster 402 may also include an uplink path 404 that may include an uplink amplification path 414. The signal booster 402 may also include a downlink path 406 that may include an upper-band downlink amplification path 436 and a lower-band downlink amplification path 446.

In the illustrated embodiment, the uplink path 404 may be configured to receive and process uplink signals and the downlink path 406 may be configured to receive and process downlink signals and lower-band downlink signals. For example, the amplification paths of the uplink path 404 and the downlink path 406 may include one or more amplifier chains configured in an analogous manner as the amplifier chains described above In the illustrated embodiment, the uplink amplification path 414 may be a common amplification path configured to receive and process (e.g., amplify) both upper-band and lower-band uplink signals. In contrast, in the illustrated embodiment, the upper-band downlink amplification path 436 and the lower-band downlink amplification path 446 may be sub-paths of the downlink path 406 and may be configured to individually receive and process upper-band downlink signals and lower-band downlink signals, respectively.

The signal booster 402 may include a signal splitter/combiner 422 communicatively coupled to the first interface port 409 via a first port 424 of the signal splitter/combiner 422. The signal splitter/combiner 422 may also be communicatively coupled to the uplink path 404 and the downlink path 406, via a second port 426 and a third port 428, respectively, of the signal splitter/combiner 422. The signal splitter/combiner 422 may be configured to receive at the first port 424 signals (e.g., upper-band and/or lower-band uplink signals) communicated from the first interface port 409 and may split the signals received from the first interface port 409 into first and second signal portions that may be output at the second port 426 and the third port 428, respectively, of the signal splitter/combiner 422. Accordingly, in the illustrated embodiment, the first signal portion may be directed toward the uplink path 404 and the second signal portion may be directed toward the downlink path 406.

With respect to the second signal portions output at the third port 428 of the signal splitter/combiner 422, in some embodiments, a diplexer 456 of the downlink path 406 may be communicatively coupled to the third port 428 such that the diplexer 456 may be configured to receive the second signal portion. The diplexer 456 may be configured to direct upper-band signals toward the upper-band downlink amplification path 436 and may be configured to direct lower-band signals toward the lower-band downlink amplification path 446.

The upper-band downlink amplification path 436 and the lower-band downlink amplification path 446 may each include one or more directional amplifiers that may be configured to amplify signals propagating toward the diplexer 456. Additionally, the directionality of the directional amplifiers may be such that signals propagating from the diplexer 456 may be stopped or substantially attenuated. Therefore, the second signal portions that may be output at the third port 428 of the signal splitter/combiner 422 may be substantially attenuated or stopped by the upper-band downlink amplification path 436 and/or the lower-band downlink amplification path 446.

With respect to the first signal portions, in some embodiments, the uplink amplification path 414 may be communicatively coupled to the second port 426 such that the uplink amplification path 414 may receive and amplify the first signal portions that may be output at the second port 426. The uplink amplification path 414 may also be configured to direct the amplified first signal portions toward a diplexer 452 of the uplink path 404 that may be communicatively coupled to the uplink amplification path 414.

The diplexer 452 may also be communicatively coupled to an upper-band duplexer 432 and a lower-band duplexer 442. The diplexer 452 may be any suitable system, apparatus, or device that may be configured to direct upper-band signals (e.g., upper-band uplink signals) received from the uplink amplification path 414 toward the upper-band duplexer 432 and configured to direct lower-band signals (e.g., lower-band uplink signals) received from the uplink amplification path toward the lower-band duplexer 442.

As such, when an amplified first signal portion is an upper-band uplink signal, the diplexer 452 may direct the amplified first portion signal toward the upper-band duplexer 432 and when an amplified first signal portion is a lower-band uplink signal, the diplexer 452 may direct the first signal portion toward the lower-band duplexer 442.

The upper-band duplexer 432 may be configured to direct upper-band uplink signals received from the diplexer 452 toward a diplexer 456 communicatively coupled to the upper-band duplexer. The lower-band duplexer 442 may be similarly configured to direct lower-band uplink signals toward the diplexer 456, which may also be communicatively coupled to the lower-band duplexer 442.

The diplexer 456 may be communicatively coupled to the second interface port 411 and may be configured such that upper-band uplink signals received from the upper-band duplexer 432 may be directed toward the second interface port 411. Further, the diplexer 456 may be configured such that lower-band uplink signals received from the lower-band duplexer 442 may also be directed toward the second interface port 411.

Accordingly, the diplexer 452, the upper-band duplexer 432, the lower-band duplexer 442, and the diplexer 454 may be configured such that when an amplified first signal portion is an amplified upper-band uplink signal or an amplified lower-band uplink signal, the amplified first signal portion may be communicated toward the second interface port 411. Therefore, in the illustrated embodiment, an amplified first signal portion may be transmitted by the second antenna 410 when the amplified first signal portion is an amplified upper-band uplink signal or an amplified lower-band uplink signal.

The diplexer 454 may also be configured to receive signals (e.g., upper-band downlink and/or lower-band downlink signals) from the second interface port 411. The diplexer 454 may be configured to direct upper-band signals (e.g., upper-band downlink signals) that may be communicated from the second interface port 411 toward the upper-band duplexer 432. Further, the diplexer 454 may be configured to direct lower-band signals (e.g., lower-band downlink signals) that may be communicated from the second interface port 411 toward the lower-band duplexer 454.

The upper-band duplexer 432 may be configured to direct upper-band uplink signals communicated from the diplexer 454 toward the diplexer 452 of the uplink path 404, which may pass the upper-band uplink signals to the uplink amplification path 414. In some embodiments, the uplink amplification path 414 may include one or more directional amplifiers that may subsequently attenuate or stop the upper-band uplink signals that may be directed toward the uplink path 404 by the upper-band duplexer 432. The upper-band duplexer 432 may also be configured to direct upper-band downlink signals communicated from the diplexer 454 toward the upper-band downlink amplification path 436, which may amplify the upper-band downlink signals.

The lower-band duplexer 442 may be configured to direct lower-band uplink signals communicated from the diplexer 454 toward the diplexer 452 of the uplink path 404, which may pass the lower-band uplink signals to the uplink amplification path 414. As mentioned above, in some embodiments, the uplink amplification path 414 may include one or more directional amplifiers that may subsequently attenuate or stop the lower-band uplink signals that may be directed toward the uplink path 404 by the lower-band duplexer 442. The lower-band duplexer 442 may also be configured to direct lower-band downlink signals communicated from the diplexer 454 toward the lower-band downlink amplification path 446, which may amplify the lower-band downlink signals.

The diplexer 456 may be configured to receive the amplified upper-band downlink signals from the upper-band downlink amplification path 436 and may be configured to receive the amplified lower-band downlink signals from the lower-band downlink amplification path 446. The diplexer 456 may be configured to direct the received amplified upper-band and lower-band downlink signals toward the third port 428 of the signal splitter/combiner 422. The signal splitter/combiner 422 may be configured to output the amplified upper-band and lower-band downlink signals at the first port 424 such that the amplified upper-band and lower-band downlink signals may be received by the first interface port 409 and may be directed away from the uplink path 404. In some embodiments, the amplified upper-band and lower-band downlink signals may be transmitted by the first antenna 408.

Accordingly, in some embodiments, the signal splitter/combiner 422 may be configured to act as a duplexer and provide isolation between the uplink path 404 and the downlink path 406. Further, the signal splitter/combiner 422 configured as described above may reduce a number of duplexers used in the signal amplifier 402, which may reduce cost, size, etc. associated with the signal amplifier 402.

Modifications, additions, or omissions may be made to the signal amplifier 402 without departing from the scope of the present disclosure. For example, in some embodiments, the uplink path 404 may include an upper-band uplink amplification path and a lower-band uplink amplification path and/or the downlink path 406 may include a common amplification path configured to receive both upper-band and lower-band downlink signals. Additionally, in some embodiments, the signal booster 402 may include any number of amplification paths for any number of frequency bands as well as any number of components such as, but not limited to, a control unit, one or more amplifier chains, one or more signal attenuators and/or one or more signal power detectors.

Additionally, as with FIG. 3, the use of the terms “upper-band” and “lower-band” is merely to differentiate between bands that may be associated with different frequency ranges. The difference in frequency between the upper-band and the lower-band may vary greatly depending on the particular application. For example, in some instances the upper-band may be within the 800 MHz frequency range and the lower-band may be within the 700 MHz frequency range. In other embodiments, the upper-band may be within the 1,900 MHz frequency range and the lower-band may be within the 700 MHz and/or the 800 MHz frequency range. Additionally, in some embodiments, the upper-band and the lower-band may be both within the 700 MHz frequency range, the 800 MHz frequency range, the 1,900 MHz frequency range, or any other suitable frequency range.

Figure 5:
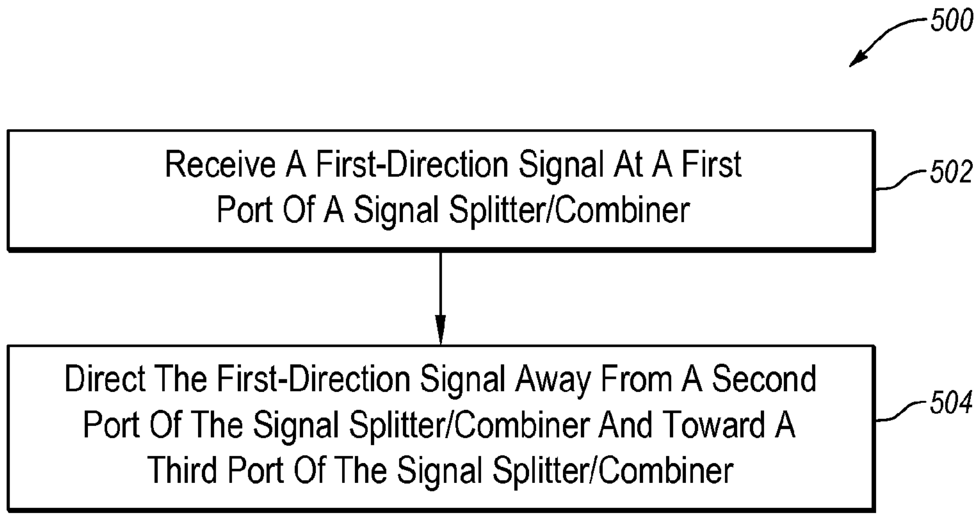
FIG. 5 is a flow chart of an example method of providing isolation between circuits.

FIG. 5 is a flow chart of an example method 500 of providing isolation between circuits, arranged in accordance with at least some embodiments described herein. One or more elements of the method 500 may be implemented, in some embodiments, by a signal splitter/combiner, such as the signal splitters/combiners **222*a* and 222*b* of FIG. 2**. Although illustrated as discrete blocks, various blocks may be divided into additional blocks, combined into fewer blocks, or eliminated, depending on the desired implementation.

The method 500 may begin at block 502, where a first-direction signal may be received at a first port of a signal splitter/combiner. The first-direction signal may propagate in a first direction. Additionally, the first port may be communicatively coupled to a first-direction path. The first direction path may be configured to receive signals propagating in the first direction. For example, the first-direction path may be an uplink path or a downlink path.

At block 504, the first-direction signal received at the first port may be directed away from a second port of the signal splitter/combiner and toward a third port of the signal splitter/combiner. In some embodiments, the second port may be communicatively coupled to a second-direction path and the third port may be communicatively coupled to an interface port (e.g., a port configured to interface with another device such as an antenna or a modem). Therefore, the first-direction signal may be directed away from the second-direction path and toward the interface port. The second-direction path may be configured for a second-direction signal that may propagate in a second direction that is opposite the first direction of the first-direction signal. For example, the first-direction path may be an uplink path and the second-direction path may be a downlink path, or vice versa.

Therefore, the method 500 may be used to provide isolation between two circuits (e.g., uplink and downlink paths). One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the method 500 may include additional steps associated with receiving, by the signal splitter/combiner, the second-direction signal from the antenna at the third port, dividing the second-direction signal into a first second-direction signal portion and a second second-direction signal portion, directing the first second-direction signal portion to the first port such that the first second-direction signal portion is received by the first-direction path, and directing the second second-direction signal portion to the second port such that the second second-direction signal portion is received by the second-direction path. In these and other embodiments, the method 500 may include steps associated with filtering out, by the first-direction path, the first second-direction signal portion received by the first-direction path.

Figure 6:
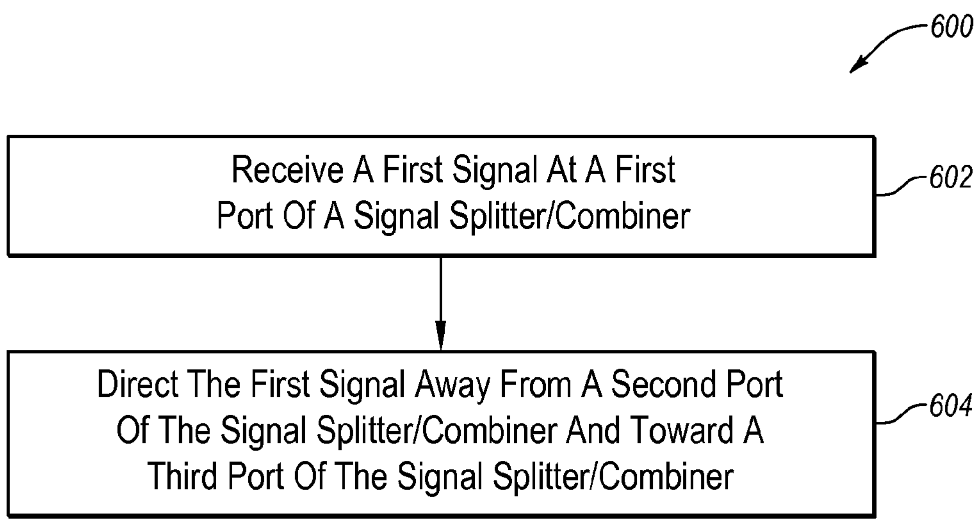
FIG. 6 is a flow chart of an example method of providing isolation between filters.

FIG. 6 is a flow chart of an example method 600 of providing isolation between filters, arranged in accordance with at least some embodiments described herein. One or more elements of the method 600 may be implemented, in some embodiments, by a signal splitter/combiner, such as the signal splitters/combiners 222*a* and 222*b* of FIG. 2 and the signal splitters/combiners 322*a* and 322*b* of FIG. 3. Although illustrated as discrete blocks, various blocks may be divided into additional blocks, combined into fewer blocks, or eliminated, depending on the desired implementation.

The method 600 may begin at block 602, where a signal splitter/combiner may receive a first signal at a first port of the signal splitter/combiner. The first port may be communicatively coupled to a first filter such that the first signal may be received from the first filter. At block 604, the signal splitter/combiner may direct the first signal received at the first port away from a second port of the signal splitter/combiner and toward a third port of the signal splitter/combiner. The second port may be communicatively coupled to a second filter such that the signal splitter/combiner may direct the first signal away from the second filter at block 604.

In some embodiments, the first filter may be included in a first-band circuit associated with a first communication band such as the upper-band circuit 330 of FIG. 3. Additionally, the second filter may be included in a second-band circuit associated with a second communication band, such as the lower-band circuit 340 of FIG. 3. In these and other embodiments, the first filter may be associated with an uplink path, such as the uplink path 204 of FIG. 2 or the uplink paths 334 and 344 of FIG. 3. Additionally, the second filter may be associated with a downlink path, such as the downlink path 206 of FIG. 2 or the downlink paths 336 and 346 of FIG. 3. Additionally, in some embodiments the first and/or second filter may be included in a duplexer. Further, in some embodiments, the first port of the signal splitter/combiner may be configured such that it may provide substantial impedance matching with the first filter and the second port of the signal splitter/combiner may be configured such that it may provide substantial impedance matching with the second filter to further improve isolation.

Accordingly, the method 600 may be used to provide isolation between filters via a signal splitter/combiner. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 600 may include additional steps associated with receiving a second signal filtered by the second filter at the second port and directing, by the signal splitter/combiner, the second signal away from the first port and toward the third port. Therefore, the signal splitter/combiner may direct the second signal away from the first filter.

Additionally, the method 600 may include other steps associated with receiving another signal at the third port of the signal splitter/combiner and dividing, by the signal splitter/combiner, the other signal into a first signal portion and a second signal portion. In these and other embodiments, the method 600 may include further steps associated with directing, by the signal splitter/combiner, the first signal portion to the first port such that the first filter receives the first signal portion and directing, by the signal splitter/combiner, the second signal portion to the second port such that the second filter receives the second signal portion. Additionally, in some embodiments, the first filter may be configured to filter out the first signal portion or the second filter may be configured to filter out the second signal portion.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system of providing filter isolation comprising:

a first filter configured to pass a first frequency range;

a second filter configured to pass a second frequency range; and a signal splitter/combiner communicatively coupled to the first filter at a first port of the signal splitter/combiner and communicatively coupled to the second filter at a second port of the signal splitter/combiner, the signal splitter/combiner configured to:

receive a first signal filtered by the first filter at the first port of the signal splitter/combiner;

direct the first signal from the first port to a third port of the signal splitter/combiner and away from the second port such that the signal splitter/combiner directs the first signal away from the second filter, and reduce a roll off requirement of one or more of the first filter and the second filter, the one or more of the first filter and the second filter having a roll off based on the reduced roll off requirement.

2. The system of claim 1, wherein the signal splitter/combiner is further configured to:

receive a second signal filtered by the second filter at the second port of the signal splitter/combiner; and direct the second signal from the second port to the third port and away from the first port such that the signal splitter/combiner directs the second signal away from the first filter.

3. The system of claim 1, wherein the signal splitter/combiner is further configured to:

receive a second signal from the third port;

divide the second signal into a first signal portion and a second signal portion;

direct the first signal portion to the first port such that the first filter receives the first signal portion; and direct the second signal portion to the second port such that the second filter receives the second signal portion.

4. The system of claim 3, wherein the first filter is configured to filter out the first signal portion.

5. The system of claim 3, wherein the second filter is configured to pass the second signal portion.

6. The system of claim 1, wherein the first port of the signal splitter/combiner provides substantial impedance matching with the first filter and the second port of the signal splitter/combiner provides substantial impedance matching with the second filter.

7. The system of claim 1, wherein the first frequency range and the second frequency range are separated by a guard band of less than 30 megahertz.

8. The system of claim 1, wherein:

the first filter is included in a first-band circuit associated with a first communication band; and the second filter is included in a second-band circuit associated with a second communication band.

9. The system of claim 1, wherein:

the first filter is associated with an uplink band of a communication band; and the second filter is associated with a downlink band of the communication band.

10. The system of claim 1, wherein:

the first filter is included in a first duplexer; and the second filter is included in a second duplexer.

11. A method of providing filter isolation comprising:

receiving a first signal filtered by a first filter at a first port of a signal splitter/combiner, the first port communicatively coupled to the first filter; and directing, by the signal splitter/combiner, the first signal received at the first port away from a second port of the signal splitter/combiner and toward a third port of the signal splitter/combiner, the second port communicatively coupled to a second filter such that the signal splitter/combiner directs the first signal away from the second filter, the signal splitter/combiner being configured to reduce a roll off requirement of one or more of the first filter and the second filter, the one or more of the first filter and the second filter having a roll off based on the reduced roll off requirement.

12. The method of claim 11 further comprising:

receiving a second signal filtered by the second filter at the second port; and directing, by the signal splitter/combiner, the second signal received at the second port away from the first port and toward the third port such that the signal splitter/combiner directs the second signal away from the first filter.

13. The method of claim 11, further comprising:

receiving a second signal at the third port of the signal splitter/combiner;

dividing, by the signal splitter/combiner, the second signal into a first signal portion and a second signal portion;

directing, by the signal splitter/combiner, the first signal portion to the first port such that the first filter receives the first signal portion; and directing, by the signal splitter/combiner, the second signal portion to the second port such that the second filter receives the second signal portion.

14. The method of claim 13, further comprising filtering out the first signal portion by the first filter.

15. The method of claim 11, wherein the first port of the signal splitter/combiner provides substantial impedance matching with the first filter and the second port of the signal splitter/combiner provides substantial impedance matching with the second filter.

16. The method of claim 11, wherein:

the first filter is included in a first-band circuit associated with a first communication band; and the second filter is included in a second-band circuit associated with a second communication band.

17. The method of claim 11, wherein:

the first filter is associated with an uplink path of a signal booster; and the second filter is associated with a downlink path of the signal booster.

18. The method of claim 11, wherein:

the first filter is included in a first duplexer; and the second filter is included in a second duplexer.

19. A system of providing filter isolation comprising:

a first filter configured to pass a first frequency range, the first filter being included in a first duplexer;

a second filter configured to pass a second frequency range, the second filter being included in a second duplexer; and a signal splitter/combiner communicatively coupled to the first filter at a first port of the signal splitter/combiner and communicatively coupled to the second filter at a second port of the signal splitter/combiner, the signal splitter/combiner being configured to:

receive a first signal filtered by the first filter at the first port of the signal splitter/combiner; and direct the first signal from the first port to a third port of the signal splitter/combiner and away from the second port such that the signal splitter/combiner directs the first signal away from the second filter.

20. A system of providing filter isolation comprising:

a first filter configured to pass a first frequency range;

a second filter configured to pass a second frequency range; and a signal splitter/combiner communicatively coupled to the first filter at a first port of the signal splitter/combiner and communicatively coupled to the second filter at a second port of the signal splitter/combiner, the first port providing substantial impedance matching with the first filter and the second port providing substantially impedance matching with the second filter, the signal splitter/combiner being configured to:

receive a first signal filtered by the first filter at the first port of the signal splitter/combiner; and direct the first signal from the first port to a third port of the signal splitter/combiner and away from the second port such that the signal splitter/combiner directs the first signal away from the second filter.

* * * * *